United States Patent
Bowen et al.

(10) Patent No.: US 6,460,721 B2
(45) Date of Patent: *Oct. 8, 2002

(54) SYSTEMS AND METHODS FOR PRODUCING AND STORING PRESSURIZED LIQUEFIED NATURAL GAS

(75) Inventors: Ronald R. Bowen, Magnolia, TX (US); Moses Minta, Sugar Land, TX (US)

(73) Assignee: ExxonMobil Upstream Research Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/495,831

(22) Filed: Feb. 1, 2000

(65) Prior Publication Data

US 2002/0053573 A1 May 9, 2002

Related U.S. Application Data

(60) Provisional application No. 60/125,725, filed on Mar. 23, 1999.

(51) Int. Cl.[7] .................................................. B65D 8/00
(52) U.S. Cl. ........................................ 220/586; 220/590
(58) Field of Search ................................ 220/586, 588, 220/589, 590, 591

(56) References Cited

U.S. PATENT DOCUMENTS

| | | | |
|---|---|---|---|
| 2,004,074 A | 6/1935 | Kiley | 220/85 |
| 2,795,937 A | 6/1957 | Sattler et al. | 62/1 |
| 2,940,268 A | 6/1960 | Morrison | 62/7 |
| 3,150,794 A | 9/1964 | Schlumberger et al. | 220/9 |
| 3,228,550 A | 1/1966 | Krenzke | 220/3 |
| 3,232,725 A | 2/1966 | Secord et al. | 48/190 |
| 3,298,805 A | 1/1967 | Secord et al. | 48/190 |
| 3,312,575 A | 4/1967 | Corbin, Jr. | 156/151 |
| 3,321,347 A | 5/1967 | Price et al. | 156/151 |
| 3,508,677 A * | 4/1970 | Laidson et al. | 220/590 |
| 3,558,000 A | 1/1971 | McCann et al. | 220/63 |
| 3,692,601 A * | 9/1972 | Goldsworthy et al. | 220/590 X |
| 3,830,180 A | 8/1974 | Bolton | 114/74 |
| 3,843,010 A | 10/1974 | Morse et al. | 220/3 |
| 3,864,918 A | 2/1975 | Lorenz | 60/651 |

(List continued on next page.)

FOREIGN PATENT DOCUMENTS

| | | |
|---|---|---|
| GB | 1522609 | 8/1978 |
| WO | WO 90/00589 | 1/1990 |
| WO | WO 98/59085 | 12/1998 |
| WO | WO 99/32837 | 7/1999 |

OTHER PUBLICATIONS

Roger Ffooks, "Natural Gas by Sea The Development of a New Technology", published 1983 (second edition) by Witherby & Co. Ltd., Chapter 14, especially pp. 162–164 and 175–176. (month of publication not provided; year of publication is sufficiently earlier than priority date that month of publication not in issue).

(List continued on next page.)

Primary Examiner—Steven Pollard
(74) Attorney, Agent, or Firm—Marcy Hoefling

(57) ABSTRACT

Systems and methods for producing and storing pressurized liquefied natural gas (PLNG) are provided, wherein the systems and methods include (a) a natural gas processing plant suitable for producing PLNG; and (b) at least one container suitable for storing the PLNG, the at least one container comprising (i) a load-bearing vessel made from a composite material and (ii) a substantially non-load-bearing liner in contact with the vessel, said liner providing a substantially impermeable barrier to the PLNG. The systems and methods also preferably include (c) means for transporting the at least one container containing PLNG to an import terminal.

19 Claims, 9 Drawing Sheets

U.S. PATENT DOCUMENTS

| | | | |
|---|---|---|---|
| 3,874,544 A | | 4/1975 | Harmon .......................... 220/3 |
| 3,895,152 A | | 7/1975 | Carlson et al. .............. 428/116 |
| 3,969,812 A | | 7/1976 | Beck ........................... 29/421 |
| 4,024,720 A | | 5/1977 | Dimentberg et al. ........... 62/55 |
| 4,182,254 A | | 1/1980 | Secord ......................... 114/74 |
| 4,266,958 A | | 5/1981 | Cummings ..................... 62/20 |
| 4,315,407 A | | 2/1982 | Creed et al. .................... 62/53 |
| 4,374,478 A | | 2/1983 | Secord ..................... 73/836.31 |
| 4,459,929 A | | 7/1984 | Ffooks ........................ 114/74 |
| 4,671,831 A | | 6/1987 | Mohan ........................ 156/69 |
| 4,835,975 A | * | 6/1989 | Windecker .............. 220/590 X |
| 5,084,219 A | | 1/1992 | Sigur ........................... 264/25 |
| 5,199,266 A | | 4/1993 | Johansen ......................... 62/8 |
| 5,211,306 A | | 5/1993 | Delonge-Immik et al. .. 220/588 |
| 5,287,987 A | | 2/1994 | Gaiser ........................ 220/589 |
| 5,325,894 A | | 7/1994 | Kooy et al. ..................... 141/4 |
| 5,385,263 A | * | 1/1995 | Kirk et al. .............. 220/586 X |
| 5,419,139 A | | 5/1995 | Blum et al. ................... 62/45.1 |
| 5,429,693 A | | 7/1995 | Rose ........................... 156/161 |
| 5,484,098 A | | 1/1996 | Anttila et al. ............... 228/184 |
| 5,499,739 A | | 3/1996 | Greist, III et al. .......... 220/589 |
| 5,518,141 A | * | 5/1996 | Newhouse et al. ......... 220/586 |
| 5,577,630 A | | 11/1996 | Blair et al. .................. 220/581 |
| 5,658,013 A | | 8/1997 | Bees et al. .................. 280/831 |
| 5,695,839 A | | 12/1997 | Yamada et al. ............. 428/35.7 |
| 5,758,796 A | | 6/1998 | Nishimura et al. ......... 220/590 |
| 5,762,119 A | | 6/1998 | Platz et al. .................. 141/231 |
| 5,798,156 A | | 8/1998 | Mitlitsky et al. ........... 428/35.9 |
| 5,803,005 A | | 9/1998 | Stenning et al. .............. 114/72 |
| 5,822,838 A | * | 10/1998 | Seal et al. .............. 220/586 X |
| 5,878,814 A | | 3/1999 | Breivik et al. .............. 166/267 |
| 5,950,453 A | | 9/1999 | Bowen et al. ................. 62/612 |
| 6,145,692 A | * | 11/2000 | Cherevatsky ........... 220/586 X |

OTHER PUBLICATIONS

R. J. Broeker, "A New Process for the Transportation of Natural Gas", International LNG Conference, Chicago, Apr. 1968, Session No. 5, Paper No. 30.

C. P. Bennett, "Marine Transportation of LNG at intermediate temperature", CME, Mar. 1979, pp. 63–64.

E. K. Faridany et al., "The Ocean Phoenix Pressure–LNG System", Gastech 1976, pp. 267–280. (month of publication not provided; year of publication is sufficiently earlier than priority date that month of publication not in issue).

E. K. M. Faridany et al., "A Pressure LNG System", European Offshore Petroleum Conference & Exhibition, Oct. 21–24, 1980, vol. EUR 171, pp. 245–254.

R. J. Broeker, "CNG and MLG–New Natural Gas Transportation Process", American Gas Journal, Jul. 1969, vol. 198, No. 8, pp. 45, 48, and 50.

Prof. E. Fluggen and Dr. I. H. Backhaus, "Pressurised LNG—and the Utilisation of Small Gas Fields", Gastech 78 LNG/LPG Conference (Monte Carlo, Nov. 7–10, 1978) Proceedings, pp. 195–204.

S. G. Ladkany, "Composite Aluminum–Fiberglass Epoxy Pressure Vessels for Transportation of LNG at Intermediate Temperature", published in *Advances in Cryogenic Engineering, Materials,* vol. 28, Proceedings of the 4th International Cryogenic Materials Conference), San Diego, CA, USA, Aug. 10–14, 1981, pp. 905–913.

L. Conder and N. L. Newhouse, "Cyclic pressure test of a filament–wound vessel containing liquid nitrogen", Cryogenics, Dec., 1980, pp. 697–701.

* cited by examiner

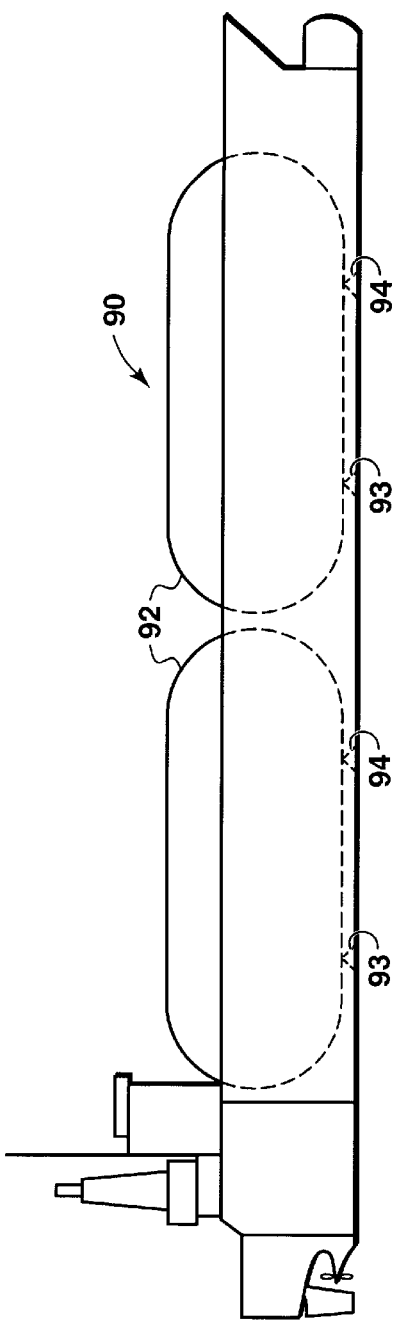
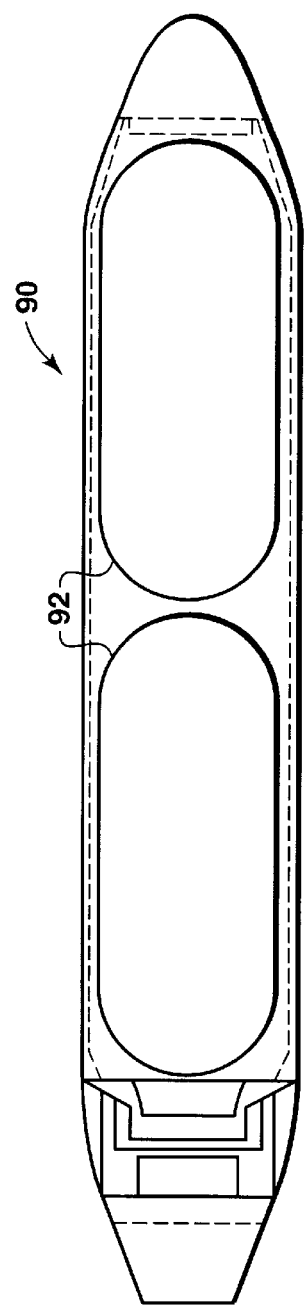
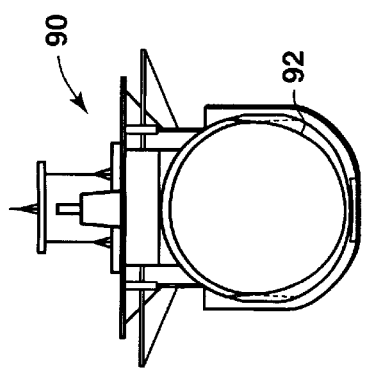

SYSTEMS AND METHODS FOR PRODUCING AND STORING PRESSURIZED LIQUEFIED NATURAL GAS

This application claims the benefit of U.S. Provisional Application No. 60/125,725, filed Mar. 23, 1999.

FIELD OF THE INVENTION

The present invention relates to improved systems and methods for producing and storing pressurized liquefied natural gas (PLNG) and, more particularly, to such systems and methods that synergistically combine the advantages of a natural gas processing plant for producing PLNG, with the advantages of novel containers for storing and transporting PLNG. More specifically, the present invention relates to such improved systems and methods that use a container comprising a load-bearing vessel made from a composite material and a substantially impermeable, non-load-bearing liner in contact with the vessel.

BACKGROUND OF THE INVENTION

Various terms are defined in the following specification. For convenience, a Glossary of terms is provided herein, immediately preceding the claims.

U.S. patent application Ser. No. 09/099,268 (the "PLNG Patent Application"), having International Patent Application Number PCT/US98/12726 and International Publication Number WO 98/59085, and entitled "Improved System for Processing, Storing, and Transporting Liquefied Natural Gas", describes containers and transportation vessels for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). Containers described in the PLNG Patent Application are constructed from ultra-high strength, low alloy steels containing less than 9 wt % nickel and having tensile strengths greater than 830 MPa (120 ksi) and DBTTs (a measure of toughness, as defined in the Glossary) lower than about −73° C. (−100° F.). As discussed in the PLNG Patent Application, at the preferred operating pressures and temperatures of the invention described therein, about 3½ wt % nickel steel can be used in the coldest operating areas of a PLNG plant for the process piping and facilities, whereas more expensive 9 wt % nickel steel or aluminum is generally required for the same equipment in a conventional LNG plant (i.e., a plant for producing LNG at atmospheric pressure and about −162° C. (−260° F.)). Preferably, high strength, low alloy steels with adequate strength and fracture toughness at the operating conditions of the PLNG plant, are used to construct the piping and associated components (e.g., flanges, valves, and fittings), pressure vessels, and other equipment of the PLNG plant in order to provide economic advantage over a conventional LNG plant. U.S. patent application Ser. No. 09/099,569 (the "Process Component Patent Application"), having International Patent Application Number PCT/US98/12725 and International Publication Number WO 99/32837, and entitled "Process Components, Containers, and Pipes Suitable For Containing and Transporting Cryogenic Temperature Fluids", describes process components, containers, and pipes suitable for containing and transporting cryogenic temperature fluids. More particularly, the Process Component Patent Application describes process components, containers, and pipes that are constructed from ultra-high strength, low alloy steels containing less than 9 wt % nickel and having tensile strengths greater than 830 MPa (120 ksi) and DBTTs lower than about −73° C. (−100° F.). The PLNG Patent Application and the Process Component Patent Application are hereby incorporated herein by reference.

The PLNG Patent Application and the Process Component Patent Application utilize ultra-high strength, low alloy steels as the connecting theme between the PLNG plant and the containers used for storing and transporting the PLNG. If use of the steels for constructing the containers did not provide a commercially viable means for storing and transporting the PLNG on marine vessels, then any use of the steels in the plant would be meaningless since there would be no mechanism for commercially transporting the PLNG produced by the plant. Conversely, while use of the steels in the PLNG plant generates some economic savings over conventional LNG operations, the most substantial economic benefit is derived from the enormous simplification (and consequent cost reductions) in the plant. Because of its relatively simple design, the PLNG plant is substantially cheaper than a conventional LNG plant of similar capacity. Additionally, while use of the steels in the PLNG transportation system is commercially viable and does generate some economic savings over conventional LNG operations, the weight of the steel containers is high compared to that of its PLNG cargo, resulting in a relatively low cargo-carrying capacity performance factor (PF). The PF for compressed fluid storage containers relates the pressure exerted by the cargo (P) to the volume (V) of the container and the weight (W) of the container by the equation PF=PV/W. What is currently missing from the all-steel PLNG system (i.e., plant plus transportation) is a combination of the PLNG plant with a low cost, higher PF, container-based transportation system that is capable of handling PLNG.

U.S. Pat. No. 3,830,180 ("Bolton") discusses use of a double-walled, composite cylindrical vessel configuration for transport of regular LNG, i.e., LNG at atmospheric pressure and at temperatures of about −162° C. (−260° F.). The cylindrical vessel configuration is preferred because it maximizes use of the space available in a transportation vessel. However, the load-bearing, inner wall of Bolton's vessel is designed for a maximum pressure of approximately 50 to 60 pounds (psi) and, thus, Bolton's vessel is not suitable for transport and storage of PLNG. Additionally, although Bolton's cylindrical vessel configuration may appear, theoretically, to improve the cargo-carrying capacity performance factor (PF) for transport of a given fluid over that of the steel containers described in the PLNG Patent Application, Bolton's design has several economic and technical limitations on size, fabrication methodology, and reliability. The use of a weldable homogeneous material for partial load bearing reduces the potential weight savings associated with a composite vessel design. Moreover the double-walled concept unduly increases the effective wall thickness, complicates the overall fabrication methodology, decreases the technical and economic feasibility of the design, and results in poor utilization of the space available on a ship for transporting cargo. Further, the design by Bolton requires the use of a homogeneous material that can be welded to form the load-bearing, inner vessel wall, which consists of two domes welded to a cylindrical mid-section. The stress concentration associated with the two welds warrants protection of the welds by using a complicated pre-stressed stay-tube arrangement. Finally, the welds in Bolton's vessels are potential sources of pitting and, consequently, of premature failure.

Both U.S. Pat. No. 5,577,630 (Blair et al.) and U.S. Pat. No. 5,798,156 (Mitlitsky et al.) describe lined, composite pressure vessels for storing and transporting compressed natural gas. Blair et al. discusses pressure vessels manufactured by overwrapping a liner with a composite layer using filament winding, tube rolling, tape wrapping, automated fiber placement, or another method familiar to those of skill in the art, to obtain a vessel configuration which approximates a rectangular volume for use in compressed natural gas ("CNG") vehicles. U.S. Pat. No. 5,499,739 (Greist, III et al.) discusses a thermoplastic liner made of a modified nylon 6 or nylon 11 material for use in a pressure vessel to control gas permeation and allow operation at low temperatures, the low end of which is stated to be −40° F. The vessels of Greist, III et al. are made by a method of overwrapping filaments in a predetermined pattern around the thermoplastic liner for improved mechanical properties and processing. U.S. Pat. No. 5,658,013 (Bees et al.) discusses a fuel tank for vehicles for holding and dispensing both a liquid and gaseous fuel, and suggests that fully-composite or fiberglass reinforced materials could be used in construction thereof. The liquid fuels discussed in the patent are conventional liquid fuels at ambient temperature and pressure. Both Bees et al. and Mitlitsky et al., previously discussed, propose precious metal-coated, polymer-based liners that provide further enhancements in performance factors of their tanks/vessels. However, the complexity and hence high cost of the metal deposition process and the liner fabrication process make the tanks/vessels of Bees et al. and Mitlitsky et al. suitable primarily for applications where maximized payload-carrying capacity is the primary objective and, thus, low tank/vessel weight is of very high premium. U.S. Pat. No. 5,695,839 (Yamada et al.) discusses a composite container which is required to have a gas barrier property, wherein the packaging material for constituting such a container is caused to have a laminate structure, and a layer of an aluminum foil is disposed or interposed in the laminate structure. However, none of the containers discussed in these publications are designed for containing fluids that are at both cryogenic temperatures (less than −40° C. (−40° F.)) and high pressures, such as the temperatures and pressures of PLNG.

S. G. Ladkany, in "Composite Aluminum-Fiberglass Epoxy Pressure Vessels for Transportation of LNG at Intermediate Temperature", published in *Advances in Cryogenic Engineering, Materials,* volume 28 (*Proceedings of the 4th International Cryogenic Materials Conference*), San Diego, Calif., USA, Aug. 10, 1981–Aug. 14, 1981, discusses the design of pressure vessels for the transportation of liquefied natural gas (LNG) at temperature and pressure conditions between the critical conditions, 191 K, 4.69 MPa (−116° F., 680 psi) and atmospheric conditions 106 K, 0.1 MPa (−268° F., 14.7 psi). Ladkany discusses in his paper that a liquid nitrogen containing, aluminum-composite vessel, of the type with a thin metal liner totally surrounded by and bonded to the overwrap covering it, was successfully tested at the Beech Aircraft Corporation. However, Ladkany opts for a large (6 m (20 ft)) diameter cylindrical, 47 mm (1.85 in) thick, welded aluminum pressure vessel for containing the intermediate temperature LNG. Ladkany's aluminum vessel is circumferentially reinforced with 17 mm (0.67 in) thick layers of high strength fiberglass epoxy or 51 mm (2 in) thick layers of pultruded glass polyester overwrap and stiffened against buckling by circumferential frames that are placed at 2.16 m (7.1 ft) intervals. The stiffening frames are also used for structurally supporting and fastening the free-standing vessel during transportation and operation.

In spite of the aforementioned advances in technology, systems and methods for producing and storing pressurized liquefied natural gas (PLNG) that synergistically combine the benefits of the PLNG processing plant, for producing PLNG, with low cost containers having a substantially improved PF, for storing and transporting PLNG, do not currently exist. It would be advantageous to have such systems and methods.

Therefore, an object of this invention is to provide such systems and methods. Other objects of this invention will be made apparent by the following description of the invention.

SUMMARY OF THE INVENTION

Consistent with the above-stated objects of the present invention, systems and methods for producing and storing pressurized liquefied natural gas (PLNG) are provided, wherein the systems and methods include (a) a natural gas processing plant suitable for producing pressurized liquefied natural gas at a pressure of about 1035 kPa (150 psia) to about 7590 kPa (1100 psia) and at a temperature of about −123° C. (−190° F.) to about −62° C. (−80° F.); and (b) at least one container suitable for storing the pressurized liquefied natural gas, the at least one container comprising (i) a load-bearing vessel made from a composite material and (ii) a substantially non-load-bearing liner in contact with the vessel, said liner providing a substantially impermeable barrier to the pressurized liquefied natural gas. The load-bearing vessel is suitable for withstanding pressures of about 1035 kPa (150 psia) to about 7590 kPa (1100 psia) and temperatures of about −123° C. (−190° F.) to about −62° C. (−80° F.).

DESCRIPTION OF THE DRAWINGS

The advantages of the present invention will be better understood by referring to the following detailed description and the attached drawings in which:

FIG. 10A is a front, cross sectional view of an arrangement in a PLNG transportation vessel hull of horizontally-situated containers according to this invention having cylindrical geometries;

FIG. 10B is a side, cross sectional view of an arrangement in a PLNG transportation vessel hull of horizontally-situated containers according to this invention having cylindrical geometries;

FIG. 10C is a top, cross sectional view of an arrangement in a PLNG transportation vessel hull of horizontally-situated containers according to this invention having cylindrical geometries;

Figure 1:
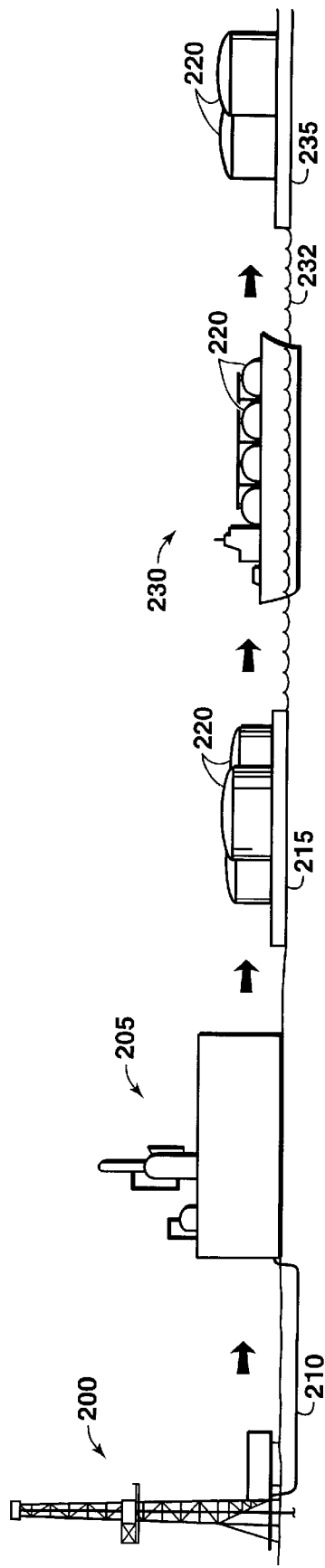
FIG. 1 provides an overview of the systems and methods of the present invention.

While the invention will be described in connection with its preferred embodiments, it will be understood that this invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

Consistent with the objects of this invention, a system is provided for producing and storing pressurized liquefied natural gas. The system comprises: (a) a natural gas processing plant suitable for producing pressurized liquefied natural gas (PLNG) at a pressure of about 1035 kPa (150 psia) to about 7590 kPa (1100 psia) and at a temperature of about −123° C. (−190° F.) to about −62° C. (−80° F.); and (b) at least one container suitable for storing the PLNG, the at least one container comprising (i) a load-bearing vessel made from a composite material; and (ii) a substantially non-load-bearing liner in contact with the vessel, the liner providing a substantially impermeable barrier to the PLNG. The load-bearing vessel is suitable for withstanding pressures of about 1035 kPa (150 psia) to about 7590 kPa (1100 psia) and temperatures of about −123° C. (−190° F.) to about −62° C. (−80° F.). The system of this invention also preferably includes (c) means for transporting the at least one storage container, preferably to an import terminal (as defined in the Glossary). Additionally, a method of producing and storing pressurized liquefied natural gas is provided. The method comprises the steps of: (a) constructing a natural gas processing plant suitable for producing pressurized liquefied natural gas (PLNG) at a pressure of about 1035 kPa (150 psia) to about 7590 kPa (1100 psia) and at a temperature of about −123° C. (−190° F.) to about −62° C. (−80° F.); (b) producing PLNG using the processing plant; and (c) delivering the PLNG to at least one container, wherein the at least one container is suitable for storing a liquid at a pressure of about 1035 kPa (150 psia) to about 7590 kPa (1100 psia) and at a temperature of about −123° C. (−190° F.) to about −62° C. (−80° F.) and comprises (i) a load-bearing vessel made from a composite material; and (ii) a substantially non-load-bearing liner in contact with the vessel, the liner providing a substantially impermeable barrier to the PLNG. The method of this invention also preferably includes the step of: (c) transporting the at least one storage container, preferably to an import terminal (as defined in the Glossary).

As used herein, "composite" or "composite material" means, broadly, a structural material comprising fibers embedded in an adhesive. For example, without limiting this invention: (i) the fibers can include fibers made from materials such as polymers, carbon, glasses, ceramics, and/or metals; and (ii) the adhesive can include resins, such as epoxy resins, particularly cryogenic epoxy resins. As used herein, the term "natural gas" means a gaseous mixture of hydrocarbons, originally generated below the surface of the earth, which comprises primarily methane and may also comprise ethane, propane, butane, higher hydrocarbons, and/or impurities, including without limiting this invention, nitrogen, carbon dioxide, hydrogen sulfide, and helium. As used herein, "constructing a natural gas processing plant suitable for producing pressurized liquefied natural gas" includes any activity taken to ready a plant to produce PLNG, including without limiting this invention, retrofitting an existing plant or building a new plant.

Systems and Methods of the Present Invention

The present invention is advantageous in that it synergistically combines the advantages of a natural gas processing plant for producing PLNG, with the advantages of novel containers for storing and transporting PLNG. Referring now to FIG. 1 for an overview of the systems and methods of this invention, without limiting this invention, natural gas produced from remote natural gas resource 200 is transported to natural gas processing plant 205 via means know to those skilled in the art, e.g., via natural gas pipeline 210. Natural gas processing plant 205 is advantageously a PLNG processing plant according to the present invention, and consists essentially of feed gas reception facilities, dehydration facilities, and liquefaction facilities. PLNG processing plant 205 preferably is located near export terminal 215 having one or more storage containers 220. In one embodiment of this invention, PLNG from PLNG processing plant 205 is produced into one or more storage containers 220 at export terminal 215. Then one or more storage containers 220 containing PLNG are loaded from export terminal 215 onto marine transportation vessel 230. In another embodiment, PLNG from one or more storage containers 220 at export terminal 215 is transferred into one or more storage containers 220 on marine transportation vessel 230, via, for example without limiting this invention, a flowline (not shown on FIG. 1) extending from one or more storage containers 220 at export terminal 215 to one or more storage containers 220 on marine transportation vessel 230. In yet another embodiment, PLNG from PLNG processing plant 205 is produced either simultaneously into one or more storage containers 220 at export terminal 215 and into one or more storage containers 220 on marine transportation vessel 230, or solely into one or more storage containers 220 on marine transportation vessel 230. Any one of composite storage containers 220 preferably comprises a load-bearing vessel made from a composite material, and a substantially non-load-bearing liner in contact with the vessel, the liner providing a substantially impermeable barrier to the PLNG, according to the present invention. Once one or more storage containers 220 on marine transportation vessel 230 contain PLNG, the one or more containers 220 are transported across the sea 232 to import terminal 235, and unloaded onto import terminal 235 for use by consumers; or alternatively, PLNG from one or more containers 220 is utilized by consumers in some other way, for example without limiting this invention, by direct transfer of PLNG from one or more containers 220 on marine transportation vessel 230 into a one or more containers 220 at import terminal 235 or into a pipeline (transfer means and pipeline not shown on FIG. 1). Thus, via this invention, natural gas from remote natural gas resource 200 is cost-effectively converted to PLNG and transported for use by consumers.

PLNG Containers

A container suitable for storing pressurized liquefied natural gas at a pressure of about 1035 kPa (150 psia) to about 7590 kPa (1100 psia) and at a temperature of about −123° C. (−190° F.) to about −62° C. (−80° F.) is provided. Such a container comprises: (a) a load-bearing vessel made from a composite material, the vessel being suitable for withstanding pressures of about 1035 kPa (150 psia) to about 7590 kPa (1100 psia) and temperatures of about −123° C. (−190° F.) to about −62° C. (−80° F.); and (b) a substantially non-load-bearing liner in contact with the vessel, the liner providing a substantially impermeable barrier to the pressurized liquefied natural gas.

Load-Bearing Vessel

Preferably, the load-bearing vessel of a container of the present invention is constructed from a composite material comprising high performance fibers having the following properties: dimensional stability, structural integrity, high tensile strength, high tensile modulus or stiffness, and low cost, among others, as will be apparent from this description of the invention. These high performance fibers preferably are of materials having a specific tensile modulus greater than about $6 \times 10^5$ centimeters and a specific tensile strength greater than about $6 \times 10^6$ centimeters, where values are normalized by fiber density.

Fibers that may be utilized in constructing the load-bearing vessels of containers of the present invention include, without limiting this invention, fibers of materials, such as, glass (e.g., E-glass and S-glass), aramid, carbon, and kevlar, in addition to others such as silicon carbide, boron filaments, and ultra-high molecular weight polyethylene ("UHMWP"), where said UHMWP preferably has a molecular weight greater than about $10^6$.

Preferably, the vessels of containers of the present invention are constructed using resins, preferably thermo-setting resins, to form a matrix and provide a substantially uniform load distribution to the fibers. Preferably the matrix resin has the following properties: good adhesion between matrix and fiber and easy fiber impregnation; low viscosity and good fiber-wetting characteristics; high tensile modulus and good shear modulus at cryogenic temperature conditions; good energy absorption characteristics and fracture toughness or ductility to maximize damage tolerance. Preferably, the resin has a shear modulus of at least about 3 Giga-Pascals (GPa) and an energy absorption capability of at least about 65 J/m$^3$.

Resins that may be utilized in constructing the matrix for the load-bearing vessels of containers of the present invention include, for example, without limiting this invention, the class of thermo-setting resins such as multifunctional epoxy resins and difunctional epoxy resins based on diglycidyl ether of bisphenol A, tetraglycidyl methylene dianiline ("TGMDA") epoxy resins, and aromatic/heterocyclic glycidyl amine resins. The resins are preferably cryogenic epoxy resins. Curing agents for the resins may be basic (e.g., amine based) or acidic (e.g., anhydride, polyphenol, or poly thiol based) co-reactants. Additionally, curing agents may be catalytic, such as tertiary amines. Further, the matrix resin may include thermoset resins enhanced by thermoplastic resins such as polysulfone, polyetherimide, or polyhydanzion. These may be amine-based resins, polyester, vinyl esters, or furan. Preferably, the composite used in constructing a vessel of the present invention is substantially non-metallic, and even more preferably, is non-metallic.

As is known to those skilled in the art, a composite vessel is typically constructed by impregnating selected fibers with a selected adhesive and wrapping the impregnated fibers over a mandrel of a selected diameter. Wrapping is continued until a desired wall thickness for the container is obtained. As is also known to those skilled in the art, in some instances a liner material is placed on the mandrel prior to beginning wrapping of the impregnated fibers to form a composite vessel over-wrapping the liner.

Non-Load-Bearing Liner

Preferably, the liners of containers of the present invention have relatively thin walls and do not have any load-bearing capability. The liners are constructed from substantially impermeable materials preferably having the following properties: toughness at cryogenic temperatures, tear resistance, gas permeation rates preferably lower than $1 \times 10^{-5}$ standard cubic centimeters per second of helium, and mechanical integrity, among other preferred properties as will be apparent from this description of the invention.

Substantially impermeable materials that may be utilized in constructing the liners of containers of the present invention include, for example, without limiting this invention, at least one sheet of: a metallic foil, a synthetic polymer film, a metallic foil on thin polymeric sheet or substrate, a metal-coated polymer substrate, or a laminate comprising a metallic liner sandwiched between polymeric layers. Suitable metallic foils include, for example, without limiting this invention, aluminum and stainless steel, preferably seamless. The primary purpose of the liner is to serve as a permeation barrier to the PLNG cargo; and the liner need only have sufficient thickness to serve this purpose. Additionally, the liner should be sufficiently strong so that it can be handled without being torn, especially during initial winding of the composite.

In one embodiment of a container according to this invention, a seamless aluminum liner is used as a cargo, e.g., PLNG, permeation barrier. In this embodiment, the seamless aluminum liner preferably has a thickness of only up to about 1 mm (0.04 in), and more preferably only about 0.5 mm (0.02 in) to about 1 mm (0.04 in). A seamless metal liner is particularly preferred for this invention to substantially minimize welding of the metal. Preferably, a seamless metal liner used in a container according to this invention requires no welding. Avoiding weld seams in the liner is preferred to avoid pitting and other problems associated therewith. However, conventional forming processes for seamless aluminum, such as cold-forming, tend to limit the size of seamless aluminum, thus limiting the diameter of a container having a seamless aluminum liner according to this invention. Additionally, due to the propensity of aluminum foil to tear, difficulty in handling a thin seamless aluminum liner increases as the diameter of the liner increases. In an alternative embodiment of this invention that substantially eliminates size constraints, the liner is a laminate fabricated from (i) at least one sheet of a substantially impermeable material, which acts as the primary cargo permeation barrier; and (ii) at least two sheets of at least one sandwiching material having better strength and/or tear resistance properties than the substantially impermeable material, to sandwich the substantially impermeable material. For the PLNG application, non-limiting examples of (i) a suitable substantially impermeable material is aluminum foil, (ii) a suitable sandwiching material with adequate strength is mylar, and (iii) a suitable sandwiching material with adequate tear resistance is a layer of woven fabric, such as dacron. A laminated liner fabricated from at least one sheet of aluminum foil, sandwiched between at least two layers of mylar or at least one layer of mylar and at least one layer of dacron, can be used in place of a seamless aluminum as a liner for controlling cargo permeation. In one embodiment, the laminated liner is fabricated from at least one sheet of aluminum foil, which acts as the primary permeation barrier. The aluminum foil preferably has a thickness of only about 0.0127 mm (0.0005 inch) to about 0.0254 mm (0.001 inch). Two sheets of mylar, each with a thickness of preferably about 0.0127 mm (0.0005 inch), are used to sandwich the aluminum foil, adding strength to the resulting laminate. Optionally, at least one sheet or layer of dacron is applied to at least one of the sheets of mylar as backing to the laminate, providing tear resistance to facilitate handling.

In some applications of the present invention, use of at least one sheet of aluminum foil as a permeation barrier is desirable. However, because of certain problems that will be familiar to those of skill in the art, such as the fact that aluminum foil tears rather easily, winding of a composite over-wrap directly onto a sheet of aluminum foil, to form the load-bearing vessel, is impracticable. A variation of the laminate concept that also overcomes these problems is to over-wrap at least one initial layer of composite with at least one sheet, preferably at least two sheets, of aluminum foil. The edges of the aluminum foil are, for example, bonded together using an appropriate adhesive or fusion bonding technique. The structural composite layers are subsequently built-up on the aluminum over-wrapping the at least one initial layer of composite. This embodiment enables initial winding of the composite over the aluminum over-wrap on a mandrel without tearing of the aluminum. For a typical composite PLNG container, the initial layer of composite is preferably about 0.16 mm (0.0063 in) thick.

In another embodiment of this invention, the liner of a container according to this invention comprises at least one layer of a coating, for example without limiting this invention, a substantially 100% solid polyurethane formulation coating, applied to the inner wall of a vessel suitable for use as a load-bearing vessel according to this invention. Such substantially 100% solid polyurethane formulation coatings are commercially available and are currently applied as moisture barriers on the exterior of steel or composite tanks. The epoxy used in bonding the fibers to form the structural composite of a container according to this invention is generally subject to micro-cracking. The micro-cracks in the epoxy increase the permeability of the composite imposing the requirement for a liner to serve as a permeation barrier. Unlike the epoxy, the substantially 100% solid polyurethane formulation is substantially insusceptible to micro-cracking. The use of a substantially continuous polyurethane coating that is not subject to micro-cracking at cryogenic temperatures, therefore, functionally serves as a liner.

Construction of Containers

Preferably a container according to this invention takes advantage of recent advances in the design and fabrication process for composite containers and the use of computation-intensive analyses based on lamination theory. These advances, coupled with empirical data on the performance of cryogenic epoxies, allow use of finite element analyses ("FEA") for determining precise fiber winding patterns to obtain desired strength and stiffness in substantially exact amounts and in all directions (axes) of a container according to this invention. This is important since strength of a composite container is anisotropic, and precise knowledge of the weakest point in the design geometry allows for optimizing material usage. Preferably, the fiber winding patterns are designed by FEA and fabricated by use of computer-controlled equipment, including without limiting this invention, winding machines and other process equipment. The direct link between the FEA design, computer aided design ("CAD") output, and the computer-controlled winding process improves accuracy, minimizes human errors, and results in substantially repeatable and consistent production as well as optimized performance of the containers. Combined with automation of the fabrication process, a cost-effective completed product is achieved by this direct link of design and fabrication tools. On-line computer analyses and monitoring of process conditions of both resin and fibers ensure quality control.

More specifically, the containers of this invention are preferably constructed using an advanced winding process wherein a multi-axis winding machine is used to provide precise winding patterns for optimized strength for the particular composite material used. The precise patterns combine cylindrical or hoop windings and helical or polar windings at winding angles determined by finite element analyses performed with a goal toward optimizing strength of the container, including through the cylinder-to-dome transition region. Further, the winding angles are designed to prevent fibers from slipping during fabrication in the cylinder-to-dome transition region without the need for additional support. The winding machines are preferably computer-controlled, allowing for high automation and enhanced precision winding. The computer controls precise placement of fibers on predefined curved surfaces. To further decrease winding time, tensioners used for the winding preferably handle large numbers of strands of fiber, e.g., 20 strands or more.

Containers Suitable for Storing and Transporting PLNG

As discussed above, containers for storing and transporting PLNG according to the present invention preferably comprise a load-bearing vessel, such as a composite over-wrap, and a substantially non-load-bearing, substantially impermeable liner.

Figure 2:
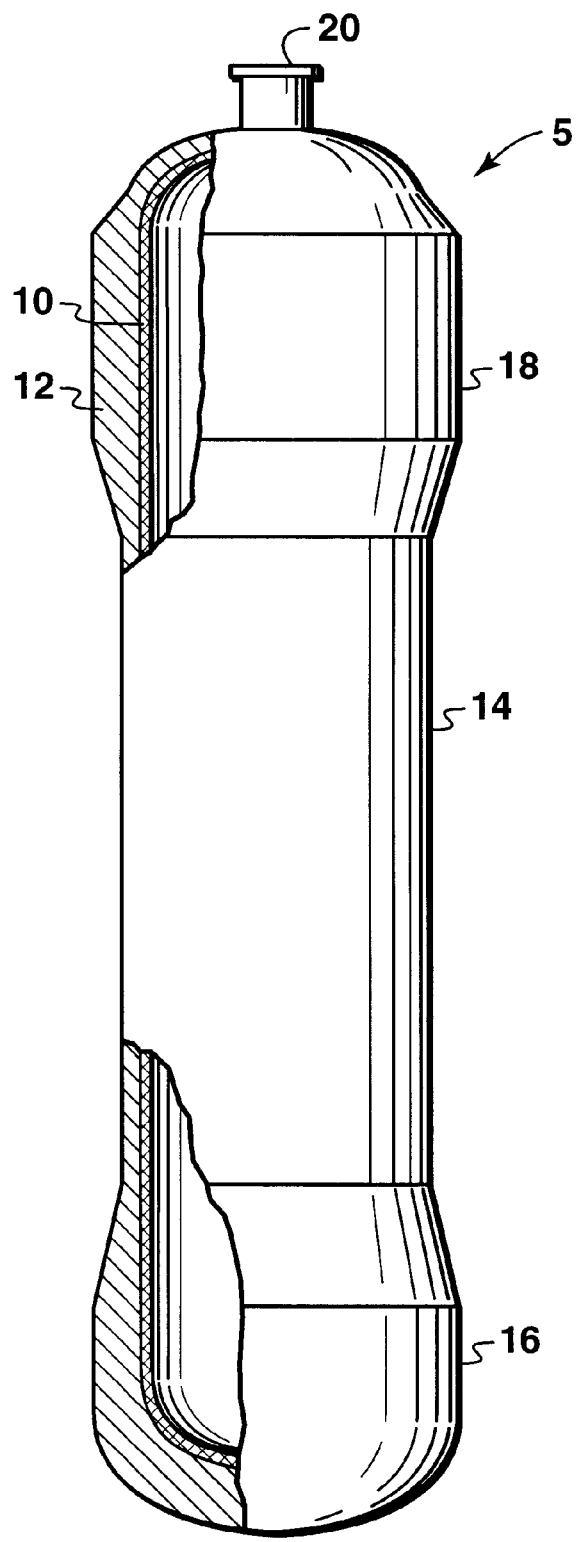
FIG. 2 illustrates, with cut-away views, a container according to this invention.

Referring to FIG. 2, one embodiment of a container 5 according to this invention comprises a composite vessel 12 made of fiber such as carbon, glass or a hybrid of carbon and glass, embedded in a cryogenic epoxy matrix, and a liner 10 made of a substantially impermeable material such as seamless aluminum, which provides a barrier for PLNG contained in container 5. To form the epoxy matrix, the fiber is preferably impregnated with resin, preferably a thermosetting resin, just prior to winding. Composite vessel 12 bears the structural load, including the internal pressure load, of container 5. Liner 10 is completely surrounded by composite vessel 12. Container 5 is preferably protected by an outer-coating 14 made of a material capable of protecting composite vessel 12 from moisture, acids, ultra-violet rays and other environmental hazards. For example, without limiting this invention, outer-coating 14 could be made from polyurethane. Container 5 may also include provision for a support system. For example, as shown in FIG. 2, a reinforcement boss 16, is provided at the lower end of container 5 for interfacing with a support skirt (not shown in FIG. 2). The design of the support skirt may be of any typical design, as will be familiar to those skilled in the art. In container 5, reinforcement boss 16 is integrally wound with composite vessel 12. This provides for significant economic benefit and also for improved structural strength and integrity of the interface between a support system and container 5. In applications in which additional support for container 5 is desirable, e.g., for transport of PLNG over particularly rough seas, additional support is provided. In one embodiment, vertical straps (not shown in FIG. 2), made of a material with adequate strength for the application at hand, for example, fiber-reinforced plastics, are attached to a ring (not shown in FIG. 2) straddling the raised embossment 18 that is wound integrally as reinforcement on the outer surface of container 5. Such vertical straps may be supported, e.g., off of structural members forming the roof of the PLNG transportation vessel carrying container 5. A nozzle 20 is provided, preferably at an upper end of container 5, to allow for penetrations into container 5, e.g. for the loading or unloading of PLNG. In one embodiment, nozzle 20 is derived from a metallic boss (not shown in FIG. 2) installed prior to winding the composite that makes up composite vessel 12. The metallic boss is over-wrapped with the composite providing a leak-tight and high-strength interface for access into container 5.

Composite vessel 12 may be constructed from any fiber/resin combination suitable for the application at hand. Fibers that may be utilized, for example, without limiting this invention, include glass, aramid, carbon, kevlar, boron, silicon carbide, and polymer matrix composites.

Table 1, below, compares key parameters for a typical steel container versus a typical container according to this invention (referred to in Table 1 as "Composite Container"), and highlights primary advantages of this invention. The steel container and the Composite Container compared in Table 1 both have a diameter of 4.6 m (15 ft) and a length of 45.7 m (150 ft). Referring to Table 1, the thermal conductivity of the composite used in constructing the Composite Container is better than that of the steel by more than an order of magnitude. Additionally, the weight of the Composite Container is less than 30% of the weight of a comparable steel container. Thus, due to the lower weight of the Composite Container, the draft of a typical PLNG transportation vessel carrying a given cargo in the Composite Container is reduced compared to the draft of a transportation vessel carrying the same cargo in comparably sized steel containers. The PLNG transportation vessel hull steel requirements are reduced correspondingly. Also, the PF for the Composite Container is more than 3 times greater than the PF for the steel container, e.g., about 7000 m ($27.5 \times 10^4$ in) vs. about 1800 m ($7.0 \times 10^4$ in).

TABLE 1

Comparison between Steel Container and Composite Container each having a diameter of about 4.6 m (15 ft) and a length of about 45.7 m (150 ft)

|  | Steel Container | Composite Container |
| --- | --- | --- |
| Material Weight [kg] (lbs) | [$134 \times 10^3$] ($295 \times 10^3$) | [$34 \times 10^3$] ($75 \times 10^3$) |
| Thermal Conductivity [Watts/m-K] (Btu/hr-ft-° F.) | [5.8 to 35] (3.3 to 20) | [0.2 to 0.23] (0.12 to 0.13) |
| PF [m] (in) | [1800] ($7.0 \times 10^4$) | [7000] ($27.5 \times 10^4$) |

Alternative Geometries for Containers

Figure 4:
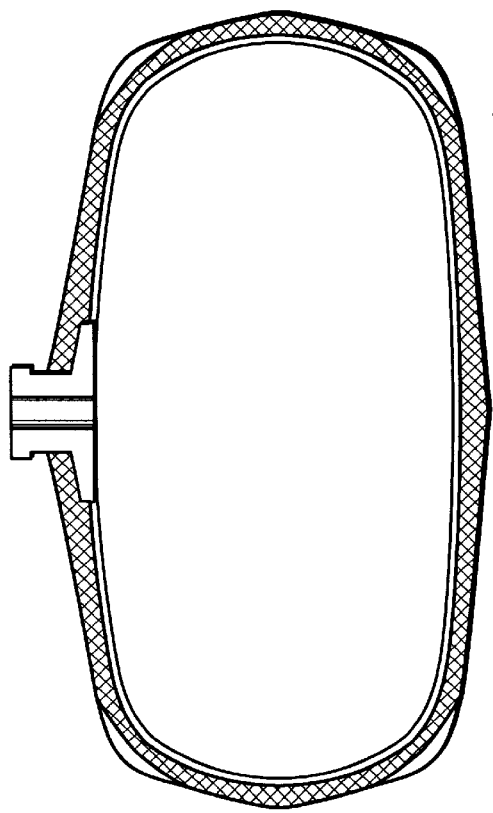
FIG. 4 is a cross section of a container according to this invention having an oblate spheroidal geometry with varying aspect ratios.
Figure 5:
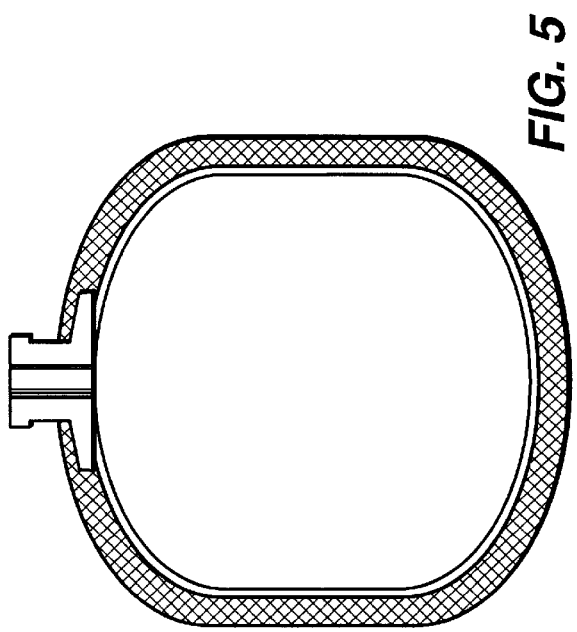
FIG. 5 is a cross section of a container according to this invention having oblate spheroidal half domes attached to a relatively short cylindrical section.
Figure 3:
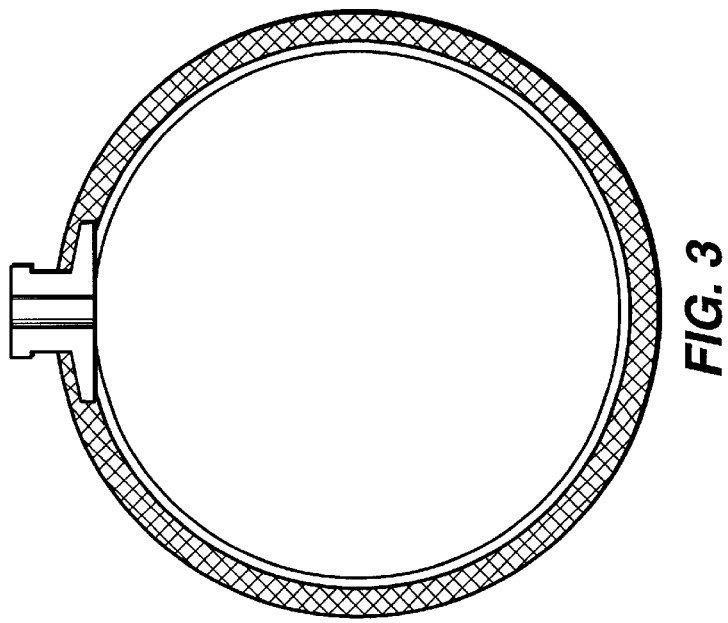
FIG. 3 is a cross section of a container according to this invention having a spherical geometry.

Alternative embodiments of the container of this invention are shown in FIGS. 3 through 5. Alternative geometric shapes for a container according to this invention include a standard spherical shape as illustrated in FIG. 3; an oblate spheroid with varying aspect ratios as illustrated in FIG. 4; as well as the combinations of oblate spheroidal half domes attached to a relatively short cylindrical section as illustrated in FIG. 5, all in contrast to the standard cylindrical configuration shown in FIG. 2. The flexibility afforded by automated winding machines and the direct computer linking of the design, drawing and fabrication processes, allow the container configurations to be optimized for structural performance. As is familiar to those of skill in the art, the spherical configuration for a steel container tends to optimize steel material usage; and, similarly, the oblate spheroid configuration for a container according to this invention tends to optimize composite material usage. Other geometric shapes, such as cylinders, generally require more material for construction, both steel and composite, but also generally utilize available space on a transportation vessel more efficiently than the spherical and oblate spheroid configurations. However, for application of composite materials in the fabrication of containers for transportation of PLNG, the optimum design is preferably based on technical and economic optimization of the total PLNG transportation system, including the container according to this invention, the PLNG transportation vessel, and the affiliated subsystems. The optimization process includes considering (i) the pipe-valves-&-fittings subsystems, (ii) other subsystems required particularly for safe system operation, (iii) support structure subsystems, (iv) container size (which impacts the beam of the transportation vessel), and (v) arrangement of the containers in the transportation vessel.

Insulated Containers

Containers that are used in methods and systems according to this invention my be insulated if desired; however, insulation is typically not necessary when the containers are transported on a marine transportation vessel because insulation is incorporated into the hold of the marine transportation vessel. When containers according to this invention are used in certain applications, for example without limiting this invention (i) in systems of vehicular, land-based distribution of PLNG, LNG, or other cryogenic fluids, as discussed in International Patent Application Number PCT/US98/12744, having International Publication Number WO 98/59195, entitled "Systems for Vehicular, Land-Based Distribution of Liquefied Natural Gas", and having U.S. application Ser. No. 09/099,265, which U.S. Application is hereby incorporated herein by reference, (ii) in pipeline distribution network systems for transporting PLNG, LNG, or other cryogenic fluids, as discussed in International Patent Applications Number PCT/US98/12704 having International Publication Number WO 98/59084, entitled "Pipeline Distribution Network Systems for Transportation of Liquefied Natural Gas" and having U.S. applications Ser. No. 09/099,267, which U.S. Application is hereby incorporated herein by reference, and (iii) in fuel storage and delivery systems for storing PLNG fuel and delivering vaporized PLNG fuel on demand for combustion in an engine, as discussed in International Patent Application Number PCT/US98/12741, having International Publication Number WO 98/59164, entitled "LNG Fuel Storage and Delivery Systems for Natural Gas Powered Vehicles", and having U.S. application Ser. No. 09/099,736, which U.S. Application is hereby incorporated herein by reference, the containers preferably have appropriate insulation. Also, pipes and other components of such systems constructed from the composite systems (i.e., fiber, resin, curing agent combinations), described herein, preferably include appropriate insulation. For the avoidance of doubt, containers according to this invention that are used in marine transportation systems may be insulated if desired; however, insulation is typically not necessary because insulation is incorporated in the hold of the marine transportation vessel.

However, in certain applications, e.g., the vehicular fuel application mentioned in the preceding paragraph, insulation is preferred to minimize loss of PLNG cargo, and to prevent cryo-pumping of liquefied air onto the cryogenic external surface of the container according to this invention, pipe, or other component. The insulation is preferably compatible with the composite material. The insulation must also have good adhesion characteristics at cryogenic conditions in order to prevent cracking or disbonds that might otherwise result from repeated thermal cycling. Further, the insulation should have cryogenic strain compatibility with the composite material. For PLNG, the temperature change during thermal cycling can be in the range of about 60° C. to about 132° C. (108° F. to 238° F.), resulting in a relative strain of 2800 to 5400 micro-inches per inch purely due to temperature change. This strain is exacerbated by the mechanical strain resulting from pressurization of the container or pipe (caused by the PLNG cargo). For most plastic closed-cell foams, the thermal mismatch or coefficient of thermal expansion (CTE) difference between the foam and the composite substrate may be as high as $20 \times 10^{-6}$ inches per inch of strain per degree Fahrenheit of temperature change. Preferred insulation materials for containers according to this invention have CTE difference an order of magnitude lower than these closed-cell foam insulating materials. The insulation material should also have good dimensional stability or low shrinkage as well as acceptable thermal conductivity. Preferred insulation will have thermal conductivity lower than 0.04 Watts/m-K (0.023 Btu/hr-ft-° F.). In summary, the preferred characteristics of the insulation material are: structural (tensile, shear, and compressive) integrity at cryogenic temperatures, cryogenic strain compatibility, cryogenic flexure and good adhesion (to composite substrate at cryogenic conditions), dimensional stability (low shrinkage), and acceptable thermal conductivity.

Several classes of compounds may be used as insulation. A group of foam materials such as polypropylene and polyethylene that meet strain and temperature and thermal conductivity requirements may be used in containers according to this invention. While such foam materials generally show instability under vacuum, it is not expected that containers according to this invention for transporting PLNG will be subject to a vacuum. Given the temperature conditions of PLNG to be stored in containers according to this invention, some conventional foams, such as polyurea, may be used in a substantially non-compact form, for example without limiting this invention, honeycomb core form sandwiched between layers of polyisocyanurate to provide an optimal-performing insulation laminate. Sprayable forms of polyisocyanurate and polyurethane may also be used for ease of application as well as moldable forms of polyurethane insulations. Thermoplastic or thermoset resins may be applied, after the winding of the composite pipe or tank, and cured to provide the thermal insulation. These must have low water absorption rate to make them attractive for many applications. Preferred resins may include CTD-620 from Composite Technology Development Inc., a two-part epoxy resin that may be sprayed or applied as the final phase of the pipe or tank winding process.

Figure 6:
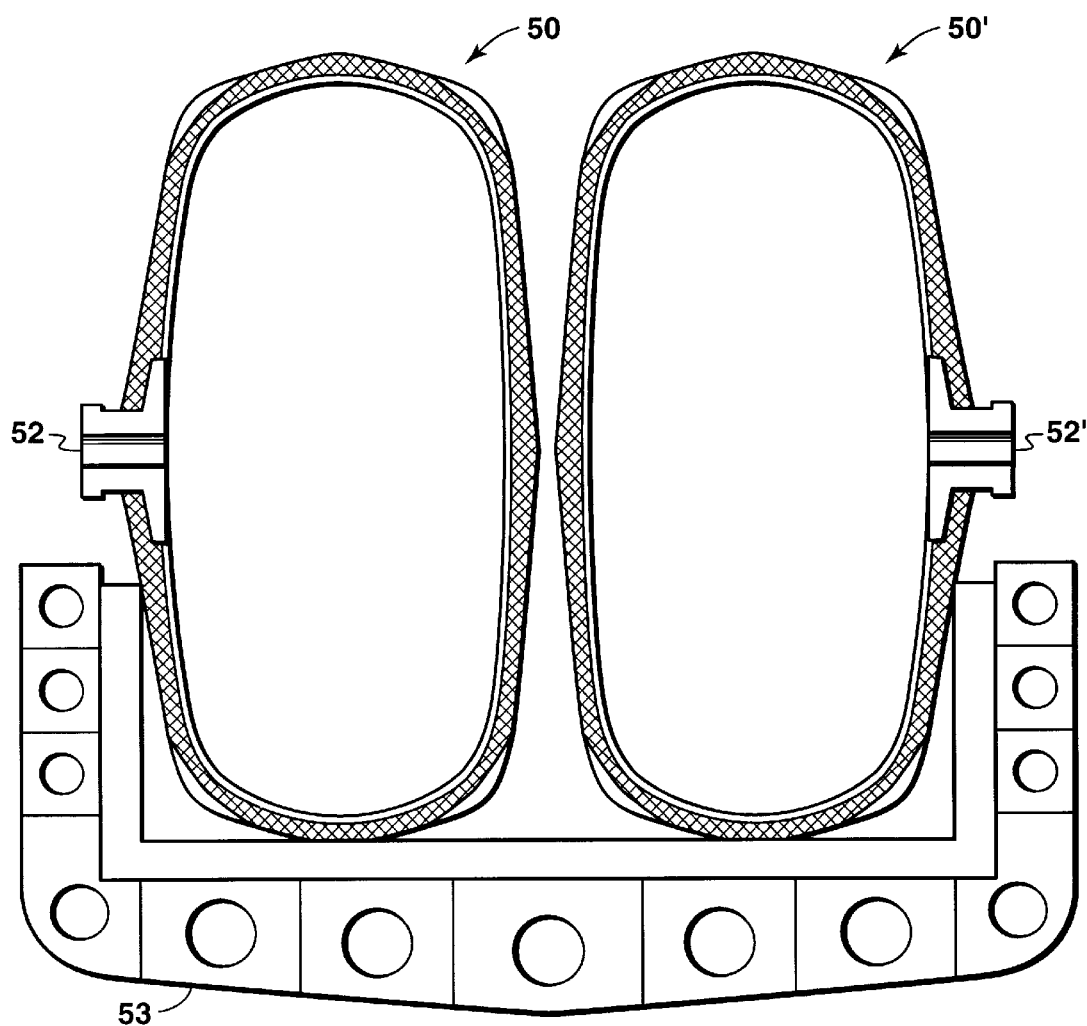
FIG. 6 is a vertical transverse cross section of a PLNG transportation vessel hull illustrating an arrangement of two containers according to this invention having oblate spheroidal geometries and arranged side by side along the width of the hull.
Figure 7B:
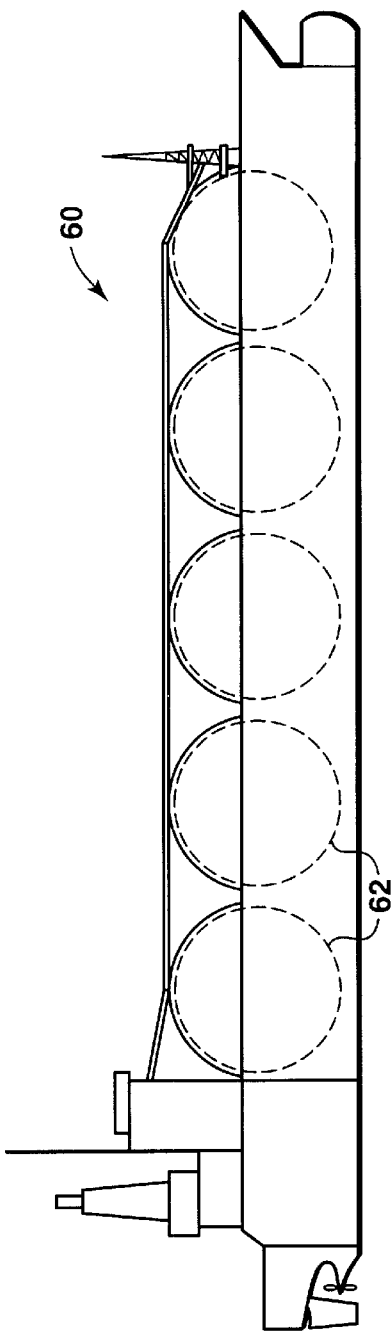
FIG. 7B is a side, cross sectional view of an arrangement in a PLNG transportation vessel hull of several containers according to this invention having spherical geometries.
Figure 7A:
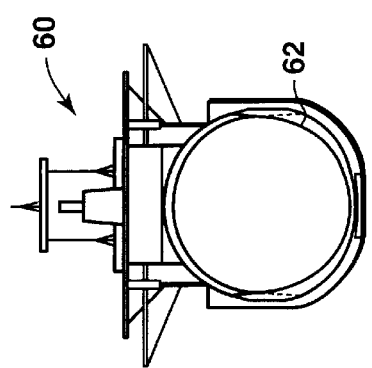
FIG. 7A is a front, cross sectional view of a container according to this invention having a spherical geometry and located in a PLNG transportation vessel hull.
Figure 7C:
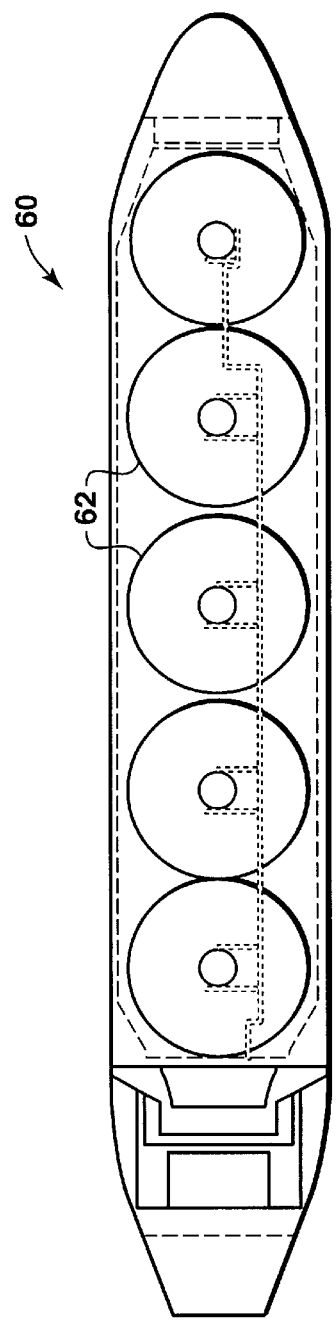
FIG. 7C is a top, cross sectional view of an arrangement in a PLNG transportation vessel hull of several containers according to this invention having spherical geometries.
Figure 8:
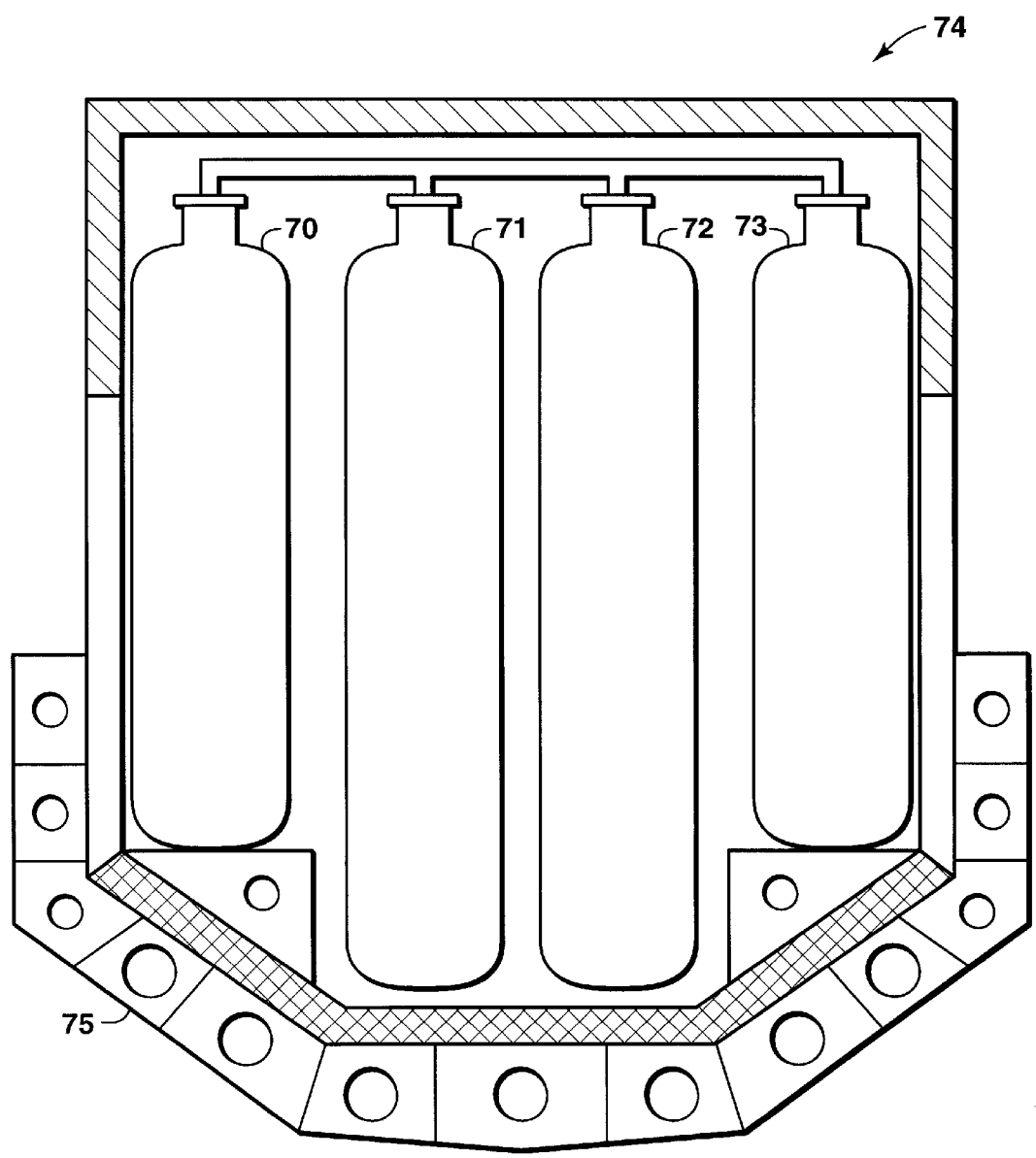
FIG. 8 is a vertical transverse cross section through a PLNG transportation vessel hull containing several containers according to this invention having cylindrical geometries with varying heights.
Figure 9:
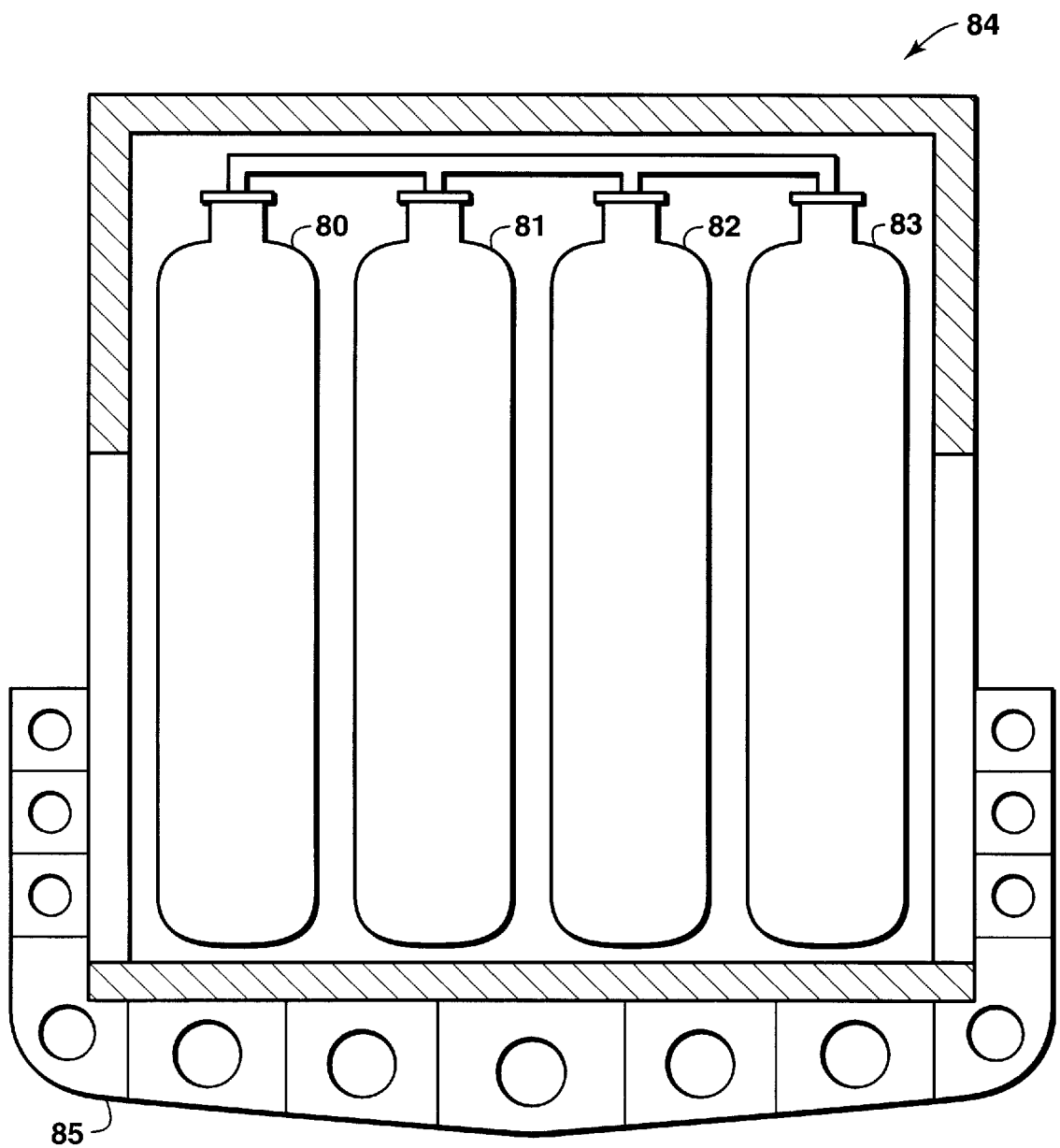
FIG. 9 is a vertical transverse cross section through a PLNG transportation vessel hull containing several containers according to this invention having cylindrical geometries with the same heights.

Arrangement of Containers According to this Invention on a PLNG Marine Transportation Vessel Different arrangements of the alternate geometries for containers according to this invention on a PLNG marine transportation vessel for use in the systems and methods of the present invention are shown in FIGS. 6 through 10C. For example, FIG. 6 illustrates two containers 50 and 50' according to this invention, arranged side by side along the width of hull 53 of a PLNG marine transportation vessel. In the embodiment illustrated by FIG. 6, nozzles 52 and 52' of containers 50 and 50' are pointed in opposite directions. FIGS. 7A, 7B, and 7C illustrate an exemplary marine transportation vessel designed to carry PLNG. This exemplary PLNG marine transportation vessel 60 holds five (5) containers 62 with standard spherical shapes. The number and dimensions of the containers required to carry a given amount of PLNG are dependent upon factors that will be familiar to those skilled in the art, such as the density of the PLNG, the target ship capacity, and the ship's propulsion power, to give a few examples without limiting this invention. FIG. 7A is a front, cross sectional view of a container according to this invention having a spherical geometry and located in a PLNG transportation vessel hull. FIG. 7B is a side, cross sectional view of an arrangement in a PLNG transportation vessel hull of several containers according to this invention having spherical geometries. FIG. 7C is a top, cross sectional view of an arrangement in a PLNG transportation vessel hull of several containers according to this invention having spherical geometries;

The orientation of containers according to this invention inside a PLNG marine transportation vessel (ship) impacts the transportation vessel hull shape design and therefore the hydrodynamics, i.e., drag or speed, of the transportation vessel. In general, a finer hull design reduces the drag on the transportation vessel and improves the power-speed characteristics of the transportation vessel. For the vertical arrangement of containers in a transportation vessel, there is a trade-off between height of containers and hull shape. Referring now to FIG. 8, the height of containers 70 and 73, located in enclosure 74, is reduced relative to the height of containers 71 and 72, also located in enclosure 74, to achieve a finer shape design for hull 75. Support means for containers 70, 71, 72, and 73, as are well known to those skilled in the art, are not shown in FIG. 8. In FIG. 9, on the other hand, all the containers 80, 81, 82, and 83, located in enclosure 84, are substantially the same height, resulting in a less than optimal, box-like shape for hull 85. Support means for containers 80, 81, 82, and 83, as are well known to those skilled in the art, are not shown in FIG. 9. For a given plot plan (available area for containers) on a marine transportation vessel, the container arrangement illustrated in FIG. 9 maximizes containment volume at the expense of transportation vessel speed (or power) compared to the container arrangement illustrated in FIG. 8. Conversely, the container arrangement illustrated in FIG. 8 minimizes transportation vessel drag at the expense of total container volume compared to the container arrangement illustrated in FIG. 9.

In an alternative embodiment, a horizontal orientation for containers according to this invention on a marine transportation vessel maximizes the cargo volume and results in a finer hull in the transportation vessel, as illustrated in FIGS. 10A, 10B, and 10C. Referring now to FIG. 10B, the lengths of horizontally oriented containers 92 are preferably defined such that each container 92 can be supported at two points, e.g., points 93 and 94. In view of the complex motion of a PLNG transportation vessel, a simple two-point support system is preferred for horizontally oriented containers 92, as will be familiar to those skilled in the art. As will also be familiar to those skilled in the art, the two-point support system imposes limitations on the lengths of containers 92. When a project requires greater storage capacity than is provided by containers of the lengths allowed by a two-point support system, a moderate increase in support system complexity enables the use of containers of longer lengths.

An advantage of the present invention is that, in general, costs associated with constructing a marine transportation vessel to transport containers according to the present invention for transporting PLNG, are low compared to costs associated with constructing a marine transportation vessel to transport steel containers for transporting PLNG. The reduced cost is due primarily to a reduction in supports required for containers according to this invention as compared to steel PLNG containers. In addition, with containers according to the present invention, associated systems are less complicated; and since the transportation vessel is lighter, less steel is required in the hull and less power is required to propel the vessel.

PLNG Plants

The novel containers of this invention make feasible the PLNG processing and transporting systems and methods of the present invention, which produce and store PLNG at a pressure in the broad range of about 1035 kPa (150 psia) to about 7590 kPa (1100 psia) and at a temperature in the range of about −123° C. (−190° F.) to about −62° C. (−80° F.). Preferably, PLNG is produced and stored at a pressure in the range of about 1725 kPa (250 psia) to about 7590 kPa (1100 psia) and at a temperature in the range of about −112° C. (−170° F.) to about −62° C. (−80° F.). More preferably, PLNG is produced and stored at a pressure in the range of about 2415 kPa (350 psia) to about 4830 kPa (700 psia) and at a temperature in the range of about −101° C. (−150° F.) to about −79° C. (−110° F.). Even more preferably, the lower ends of the pressure and temperature ranges for PLNG are about 2760 kPa (400 psia) and about −96° C. (−140° F.). Within the preferred ranges, ideal temperature and pressure combinations are dependent upon the composition of the natural gas being liquefied and upon economic considerations. A person skilled in the art may determine the effect of compositional parameters by referring to standard industry publications and/or performing equilibrium bubble point calculations. Additionally, a person skilled in the art may determine and analyze the impact of the different economic considerations by referring to standard industry publications. For example, one economic consideration is that as the temperature of the PLNG gets colder, refrigeration horsepower requirements increase; however, colder temperatures for PLNG also increase the density of the PLNG and, thereby, reduce the volume that must be transported. As the temperature of the PLNG gets warmer, and the pressure increases, more material is required in storage and transport containers, but the refrigeration costs decrease and the plant efficiency increases.

Figure 11:
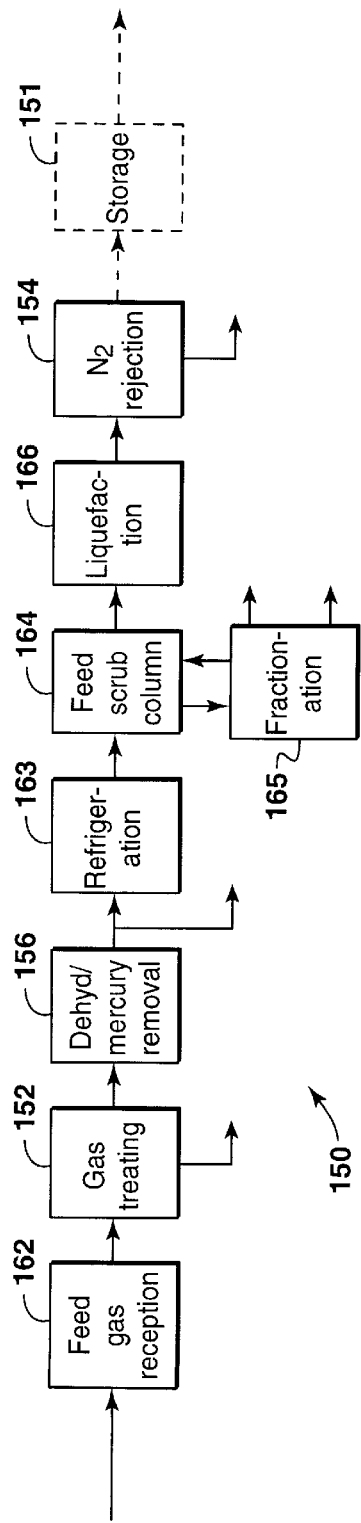
FIG. 11 (PRIOR ART) schematically illustrates an exemplary plant for processing conventional LNG.
Figure 12:
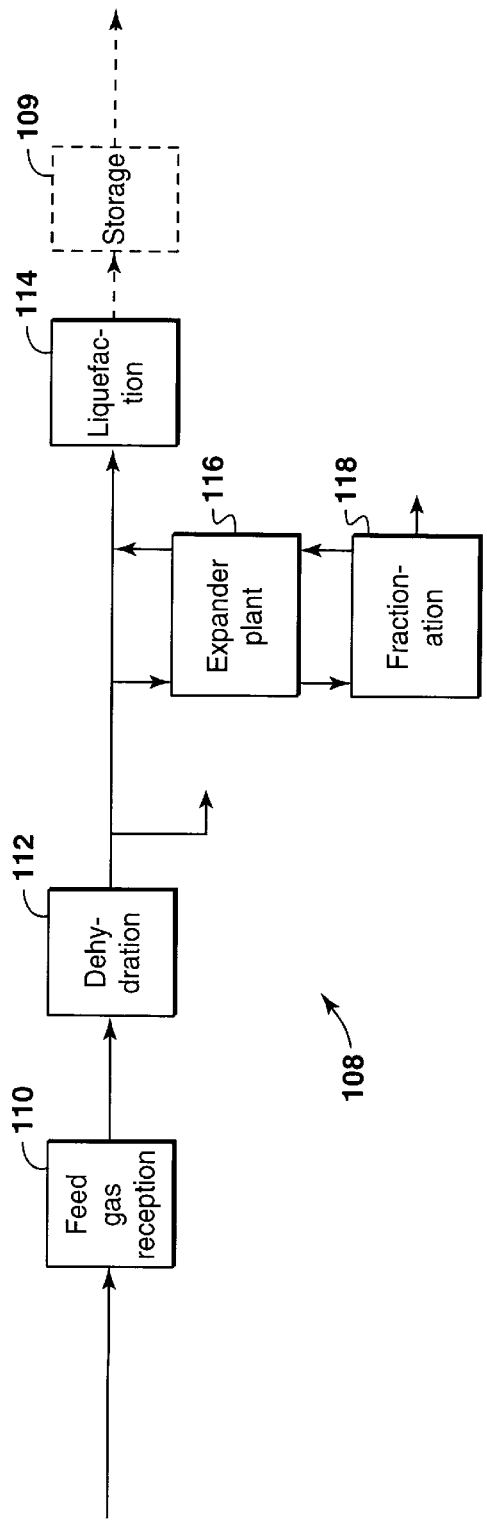
FIG. 12 schematically illustrates an exemplary plant for processing PLNG according to the present invention.

The following description focuses primarily on the economically advantageous differences of a system of the present invention as compared to a conventional system for processing LNG. FIG. 12 illustrates schematically an exemplary plant for processing PLNG according to the present invention. For comparison purposes, FIG. 11 (Prior Art) illustrates schematically an exemplary plant for processing conventional LNG. As shown in FIG. 11, an exemplary plant for processing conventional LNG includes feed gas reception equipment 162, gas treating equipment 152, dehydration/mercury removal equipment 156, refrigeration equipment 163, feed scrub equipment 164, fractionation equipment 165, liquefaction equipment 166, and nitrogen rejection equipment 154. While standard natural gas liquefaction equipment can be satisfactorily utilized in a processing plant for the present invention, several steps required in a conventional LNG plant can be eliminated, and energy needed for cooling the natural gas is greatly reduced. Thus, in the PLNG process, natural gas that would be consumed for providing energy in the conventional LNG process can be converted to marketable PLNG. Referring to FIG. 12, the PLNG processing system components/method steps preferably include (i) feed gas reception facilities 110 for removing liquid hydrocarbons, (ii) dehydration facilities 112, and (iii) liquefaction facilities 114. An expander plant 116 and fractionation train 118 can be used to produce make-up refrigerants for use in the liquefaction facilities 114. Alternatively either part or all of the refrigerants needed for the liquefaction 114 can be purchased and/or supplied from some other source. Well-known refrigeration processes can be used to achieve the desired low temperature of the PLNG. Such processes may include, for example, a single refrigerant, a multicomponent refrigerant, a cascade refrigeration cycle or combinations of these cycles. Additionally, expansion turbines may be used in the refrigeration process. Compared to a conventional LNG plant, the very large reduction of necessary refrigeration horsepower in a PLNG plant according to the present invention results in a large reduction in capital costs, proportionately lower operating expenses, and increased efficiency and reliability, thus greatly enhancing the economics of producing liquefied natural gas.

A plant for producing PLNG according to the present invention compares to a conventional LNG process as follows. Referring to FIG. 11 and FIG. 12, since the liquefaction temperatures in the PLNG plant 108 (FIG. 12) are higher than in a conventional LNG plant 150 (FIG. 11) (that produces conventional LNG at about −162° C. (−260° F.) and atmospheric pressure), the gas treating equipment 152 (FIG. 11) for removal of freezable components such as carbon dioxide, n-pentane plus, and benzene, which are required in the conventional LNG plant 150, are generally not required in the PLNG plant 108 because these naturally occurring components will not normally freeze and cause plugging problems in the PLNG plant equipment due to the warmer operating temperatures. If unusually high amounts of carbon dioxide, sulfur-containing compounds, n-pentane plus, or benzene are present in a natural gas being processed by a PLNG plant 108, some minimal gas treating equipment for removal thereof may be added as needed. Additionally, nitrogen must be removed in the conventional LNG plant 150 (in the nitrogen rejection facility 154) because nitrogen will not remain in the liquid phase during transport of conventional LNG, which is at atmospheric pressure. Moderate amounts of nitrogen in the inlet gas need not be removed in the PLNG plant 108 because nitrogen will remain in the liquid phase with the liquefied hydrocarbons at the operating pressures and temperatures of the PLNG process. Additionally, mercury is removed in a conventional LNG plant 150 (in mercury removal equipment 156). Since the PLNG plant 108 operates at much warmer temperatures than a conventional LNG plant 150 and, therefore, aluminum materials need not be used in the containers, piping, and other equipment of the PLNG plant 108, mercury removal equipment will generally not be required in the PLNG plant 108. The ability to omit the equipment required for gas treating, nitrogen rejection, and mercury removal when the composition of the natural gas allows, provides significant technical and economic advantage.

The processes described in the following publications and co-pending patent applications may be used in PLNG plant 108: (i) "Improved Multi-Component Refrigeration Process for Liquefaction of Natural Gas", U.S. application Ser. No. 09/099,262 and International Publication Number WO 98/59206; and (ii) "Continuous Expansion Pre-cooling Cycle for Natural Gas Liquefaction", U.S. Provisional Application No. 60/172,548. The U.S. Application and U.S. Provisional Application mentioned in this paragraph are hereby incorporated herein by reference.

Referring again to FIG. 11, LNG produced in a conventional LNG plant 150 is stored in one or more storage containers 151 at a nearby export terminal. Referring now to FIG. 12, PLNG produced in a PLNG plant 108 may be stored in one or more storage containers 109 according to this invention, at a nearby export terminal. In another embodiment of this invention, PLNG produced in a PLNG plant 108 may be transferred to one or more transportation storage containers 109 according to this invention on a PLNG transportation vessel, as further described herein.

As also discussed in the PLNG Patent Application and the Process Component Patent Application, at the preferred operating pressures and temperatures for PLNG, about 3½ wt % nickel steel can be used in the coldest operating areas of the PLNG plant for the process piping and facilities, whereas the more expensive 9 wt % nickel steel or aluminum is generally required for the same equipment in a conventional LNG plant. This provides another significant cost reduction for the PLNG plant compared to the conventional LNG plant. Preferably, high strength, low alloy steels with adequate strength and fracture toughness at the operating conditions of the PLNG plant, are used to construct process components of the PLNG plant in order to provide further economic advantage over a conventional LNG plant. As used hereinafter, the term "process component" includes any of a plurality of components useful for converting natural gas to produce PLNG in a processing plant, including without limiting this invention, pipes, heat exchangers, pressure vessels, and other containers. A processing plant for converting natural gas to produce PLNG according to the present invention preferably comprises at least one process component constructed from an ultra-high strength, low alloy steel containing less than 9 wt % nickel and having a tensile strength greater than about 830 MPa (120 ksi) and a DBTT lower than about −73° C. (−100° F.). Suitable steels for use in constructing the process components are more fully described in the PLNG Patent Application; in a co-pending U.S. patent application entitled "ULTRA-HIGH STRENGTH STEELS WITH EXCELLENT CRYOGENIC TEMPERATURE TOUGHNESS", U.S. application Ser. No. 09/099,649 and International Publication Number WO 99/32672; in a co-pending U.S. patent application entitled "ULTRA-HIGH STRENGTH AUSAGED STEELS WITH EXCELLENT CRYOGENIC TEMPERATURE TOUGHNESS", U.S. application Ser. No. 09/099,153 and International Publication Number WO 99/32670; in a co-pending U.S. patent application entitled "ULTRA-HIGH STRENGTH DUAL PHASE STEELS WITH EXCELLENT CRYOGENIC TEMPERATURE TOUGHNESS", U.S. application Ser. No. 09/099,152 and International Publication Number WO 99/32671; in a co-pending U.S. patent application entitled "ULTRA-HIGH STRENGTH STEELS WITH EXCELLENT CRYOGENIC TEMPERATURE TOUGHNESS", U.S. application Ser. No. 09/215,774 and International Application Number PCT/US99/29802; in a co-pending U.S. patent application entitled "ULTRA-HIGH STRENGTH AUSAGED STEELS WITH EXCELLENT CRYOGENIC TEMPERATURE TOUGHNESS", U.S. application Ser. No. 09/215,773 and International Application Number PCT/US99/30055; and in a co-pending U.S. patent application entitled "ULTRA-HIGH STRENGTH TRIPLE PHASE STEELS WITH EXCELLENT CRYOGENIC TEMPERATURE TOUGHNESS", U.S. application Ser. No. 09/215,772 and International Application Number PCT/US99/29804 (collectively, the "Steel Patent Applications"). The U.S. Patent Applications discussed in this paragraph are hereby incorporated herein by reference. The steels described in the Steel Patent Applications are especially suitable for cryogenic temperature applications in that the steels have the following characteristics for steel plate thicknesses of about 2.5 cm (1 inch) and greater: (i) DBTT lower than about −73° C. (−100° F.) in the base steel and in the weld HAZ, (ii) tensile strength greater than about 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, HSLA steels. These steels can have a tensile strength of greater than about 930 MPa (135 ksi), or greater than about 965 MPa (140 ksi), or greater than about 1000 MPa (145 ksi).

In summary, the present invention is advantageous in that it provides systems and methods for storing and transporting pressurized liquefied natural gas (PLNG) at a pressure of about 1035 kPa (150 psia) to about 7590 kPa (1100 psia) and at a temperature of about −123° C. (−190° F.) to about −62° C. (−80° F.). The containers used in the systems and methods of this invention have a substantially improved cargo-carrying capacity performance factor (PF) over currently available containers for PLNG, e.g., a PF of about 7000 m ($27.5 \times 10^4$ in) as compared to a PF of about 1800 m ($7.0 \times 10^4$ in) for steel containers. Containers according to this invention also meet the other objectives for the present invention as discussed herein.

The desired variables for a container according to this invention, e.g., size, geometry, material thickness, etc., are dependent upon operating conditions such as internal pressure, operating temperature, target cargo, target transportation vessel (ship) characteristics of size, speed-power relationship, etc., as will be familiar to those skilled in the art. More specifically, the variables are also dependent on such factors as (i) the high structural integrity and dimensional stability characteristics of high-performance fibers; (ii) good fiber impregnation and fiber-wetting characteristics of cryogenic resins as well as good adhesion between matrix resin and fiber; (iii) recent advances in computerized composite winding machines that allow for high automation and enhanced precision in fiber placement during winding; (iv) advances in computation-intensive design and analyses tools based on finite element analysis and lamination theory; and (v) the ability to link the design directly to computer-based winding machines to produce precise winding patterns for optimized strength of the resulting composite system.

While the present invention has been described in terms of one or more preferred embodiments, it is to be understood that other modifications may be made without departing from the scope of the invention, which is set forth in the claims below.

| Glossary of terms: | |
|---|---|
| Btu/hr-ft-° F.: | British thermal units/(hour)(foot)(° Fahrenheit); |
| CAD: | computer aided design; |
| CNG: | compressed natural gas; |
| composite (composite material); | a structural material comprising fibers embedded in an adhesive; |
| cryogenic temperature: | any temperature lower than about −40° C. (−40° F.); |
| DBTT (Ductile-to-Brittle Transition Temperature): | delineates the two fracture regimes in structural steels - at temperatures below the DBTT, failure tends to occur by low energy cleavage (brittle) fracture, while at temperatures above the DBTT, failure tends to occur by high energy ductile fracture; |

-continued

Glossary of terms:

| | |
|---|---|
| FEA: | finite element analyses; |
| GPa: | billion ($10^9$) Pascals; |
| import terminal: | any facility adapted for receiving or utilizing PLNG, including without limiting this invention, facilities located offshore; |
| $J/m^3$: | Joules per cubic meter; |
| kPa: | thousands of Pascals; |
| natural gas: | a gaseous mixture of hydrocarbons, originally generated below the surface of the earth, which comprises primarily methane and may also comprise ethane, propane, butane, higher hydrocarbons, and/or impurities, including without limiting this invention, nitrogen, carbon dioxide, hydrogen sulfide, and helium; |
| PF: | cargo-carrying capacity performance factor, PF = PV/W where PV is the pressure exerted by the cargo multiplied by the volume of the container and W is the weight of the container; |
| PLNG: | pressurized liquefied natural gas; |
| process component: | includes any of a plurality of components useful for converting natural gas to produce PLNG in a PLNG processing plant, including without limiting this invention, pipes, heat exchangers, pressure vessels, and other containers; |
| psi: | pounds per square inch; |
| psia: | pounds per square inch absolute; |
| TGMDA: | tetraglycidyl methylene dianiline; and |
| UHMWP: | ultra-high molecular weight polyethylene. |

What we claim is:

1. A container suitable for storing pressurized liquefied natural gas at a pressure of about 1035 kPa (150 psia) to about 7590 kPa (1100 psia) and at a temperature of about −123° C. (−190° F.) to about −62° C. (−80° F.), said container comprising:

(a) a load-bearing vessel made from a composite material comprising a resin having a shear modulus of at least about 3 Giga-Pascals at cryogenic temperatures and an energy absorption capability of at least about 65 $J/m^3$, said vessel being suitable for withstanding pressures of about 1035 kPa (150 psia) to about 7590 kPa (1100 psia) and temperatures of about −123° C. (−190° F.) to about −62° C. (−80° F.); and (b) a substantially non-load-bearing liner in contact with said vessel, said liner providing a substantially impermeable barrier to said pressurized liquefied natural gas and being constructed from a material selected from the group consisting of (i) a metallic foil, (ii) a synthetic polymer film, (iii) a metallic foil on thin polymeric substrate, (iv) a metal-coated polymer substrate, (v) a laminate comprising a metallic liner sandwiched between polymeric layers, (vi) a laminate comprising at least one sheet of aluminum foil sandwiched between at least two sheets of mylar, and (vii) at least one layer of composite material and at least one sheet of aluminum foil.

2. The container of claim 1 wherein said vessel is constructed from a plurality of fibers of materials having a specific tensile modulus greater than about $6\times10^5$ centimeters and a specific tensile strength greater than about $6\times10^6$ centimeters, where values are normalized by fiber density.

3. The container of claim 2 wherein said liner has a thickness of up to 1 mm (0.04 in).

4. The container of claim 1 wherein said vessel is constructed from a plurality of fibers of materials selected from the group consisting of (i) glass, (ii) aramid, (iii) carbon, (iv) kevlar, (v) silicon carbide, (vi) boron filament, (vii) UHMWP, or (viii) mixtures thereof.

5. The container of claim 1 wherein said vessel comprises a composite matrix constructed from a resin selected from the group consisting of (i) multifunctional epoxy resins and difunctional epoxy resins based on diglycidyl ether of bisphenol A, (ii) TGMDA epoxy resins, (iii) amine-based resins, (iv) polyester, (v) vinyl esters, and (vi) furan.

6. A container comprising (1) a substantially non-load-bearing, substantially impermeable liner, said liner being constructed from a material selected from the group consisting of (i) a metallic foil, (ii) a synthetic polymer film, (iii) a metallic foil on thin polymeric substrate, (iv) a metal-coated polymer substrate, (v) a laminate comprising a metallic liner sandwiched between polymeric layers, (vi) a laminate comprising at least one sheet of aluminum foil sandwiched between at least two sheets of mylar, and (vii) at least one layer of composite material and at least one sheet of aluminum foil, and (2) a load-bearing, composite overwrap comprising a resin having a shear modulus of at least about 3 Giga-Pascals at cryogenic temperatures and an energy absorption capability of at least about 65 $J/m^3$, said container being suitable for storing pressurized liquefied natural gas at a pressure of about 1035 kPa (150 psia) to about 7590 kPa (1100 psia) and at a temperature of about −123° C. (−190° F.) to about −62° C. (−80° F.).

7. A method of constructing a container suitable for storing pressurized liquefied natural gas at a pressure of about 1035 kPa (150 psia) to about 7590 kPa (1100 psia) and at a temperature of about −123° C. (−190° F.) to about −62° C. (−80° F.), said method comprising the steps of:

(a) creating a computer-implementable design for said container by finite element analyses performed with a goal toward optimizing strength of said container;

(b) forming a liner from a substantially impermeable material selected from the group consisting of (i) a metallic foil, (ii) a synthetic polymer film, (iii) a metallic foil on thin polymeric substrate, (iv) a metal-coated polymer substrate, (v) a laminate comprising a metallic liner sandwiched between polymeric layers, (vi) a laminate comprising at least one sheet of aluminum foil sandwiched between at least two sheets of mylar, and (vii) at least one layer of composite material and at least one sheet of aluminum foil;

(c) placing said liner on a mandrel;

(d) impregnating a plurality fibers of materials having a specific tensile modulus greater than about $6\times10^5$ centimeters and a specific tensile strength greater than about $6\times10^6$ centimeters, where values are normalized by fiber density, with a resin having a shear modulus of at least about 3 Giga-Pascals at cryogenic temperatures and an energy absorption capability of at least about 65 $J/m^3$; and (e) wrapping said plurality of fibers around said liner via a computer-run winding machine that is implementing said computer-implementable design to form a load-bearing vessel.

8. The method of claim 7 wherein step (d) is replaced with the following:

(d) impregnating a plurality of fibers of materials selected from the group consisting of (i) glass, (ii) aramid, (iii) carbon, (iv) kevlar, (v) silicon carbide, (vi) boron filament, (vii) UHMWP, or (viii) mixtures thereof, with a resin having a shear modulus of at least about 3 Giga-Pascals at cryogenic temperatures and an energy absorption capability of at least about 65 $J/m^3$.

9. A method of storing pressurized liquefied natural gas at a pressure of about 1035 kPa (150 psia) to about 7590 kPa (1100 psia) and at a temperature of about −123° C. (−190° F.) to about −62° C. (−80° F.), said method comprising the step of containing said pressurized liquefied natural gas in at least one container, said at least one container comprising (i) a load-bearing vessel made from a composite material comprising a resin having a shear modulus of at least about 3 Giga-Pascals at cryogenic temperatures and an energy absorption capability of at least about 65 J/m$^3$; and (ii) a substantially non-load-bearing liner in contact with said vessel, said liner providing a substantially impermeable barrier to said pressurized liquefied natural gas and being constructed from a material selected from the group consisting of (i) a metallic foil, (ii) a synthetic polymer film, (iii) a metallic foil on thin polymeric substrate, (iv) a metal-coated polymer substrate, (v) a laminate comprising a metallic liner sandwiched between polymeric layers, (vi) a laminate comprising at least one sheet of aluminum foil sandwiched between at least two sheets of mylar, and (vii) at least one layer of composite material and at least one sheet of aluminum foil.

10. A system for producing and storing pressurized liquefied natural gas comprising:
    (a) a natural gas processing plant suitable for producing pressurized liquefied natural gas at a pressure of about 1035 kPa (150 psia) to about 7590 kPa (1100 psia) and at a temperature of about −123° C. (−190° F.) to about −62° C. (−80° F.); and
    (b) at least one container suitable for storing said pressurized liquefied natural gas at a pressure of about 1035 kPa (150 psia) to about 7590 kPa (1100 psia) and at a temperature of about −123° C. (−190° F.) to about −62° C. (−80° F.), said at least one container comprising (i) a load-bearing vessel made from a composite material comprising a resin having a shear modulus of at least about 3 Giga-Pascals at cryogenic temperatures and an energy absorption capability of at least about 65 J/m$^3$; and (ii) a substantially non-load-bearing liner in contact with said vessel, said liner providing a substantially impermeable barrier to said pressurized liquefied natural gas and being constructed from a material selected from the group consisting of (1) a metallic foil, (2) a synthetic polymer film, (3) a metallic foil on thin polymeric substrate, (4) a metal-coated polymer substrate, (5) a laminate comprising a metallic liner sandwiched between polymeric layers, (6) a laminate comprising at least one sheet of aluminum foil sandwiched between at least two sheets of mylar, and (7) at least one layer of composite material and at least one sheet of aluminum foil.

11. The system of claim 10 further comprising:
    (c) means for transporting said at least one container holding said pressurized liquefied natural gas to an import terminal.

12. The system of claim 10 wherein said load-bearing vessel is suitable for withstanding pressures of about 1035 kPa (150 psia) to about 7590 kPa (1100 psia) and temperatures of about −123° C. (−190° F.) to about −62° C. (−80° F.).

13. The system of claim 10 wherein said natural gas processing plant comprises at least one process component constructed from an ultra-high strength, low alloy steel containing less than 9 wt % nickel and having a tensile strength greater than about 830 MPa (120 ksi) and a DBTT lower than about −73° C. (−100° F.).

14. The system of claim 10 wherein said natural gas processing plant consists essentially of:
    (a) feed gas reception facilities suitable for removing liquid hydrocarbons from natural gas;
    (b) dehydration facilities suitable for removing water from natural gas; and
    (c) liquefaction facilities suitable for liquefying natural gas.

15. A method of producing and storing pressurized liquefied natural gas, comprising the steps of:
    (a) constructing a natural gas processing plant suitable for producing pressurized liquefied natural gas at a pressure of about 1035 kPa (150 psia) to about 7590 kPa (1100 psia) and at a temperature of about −123° C. (−190° F.) to about −62° C. (−80° F.);
    (b) producing pressurized liquefied natural gas at a pressure of about 1035 kPa (150 psia) to about 7590 kPa (1100 psia) and at a temperature of about −123° C. (−190° F.) to about −62° C. (−80° F.), by processing natural gas using said natural gas processing plant; and
    (c) delivering said pressurized liquefied natural gas to at least one container, wherein said at least one container is suitable for storing a liquid at a pressure of about 1035 kPa (150 psia) to about 7590 kPa (1100 psia) and at a temperature of about −123° C. (−190° F.) to about −62° C. (−80° F.) and comprises (i) a load-bearing vessel made from a composite material comprising a resin having a shear modulus of at least about 3 Giga-Pascals at cryogenic temperatures and an energy absorption capability of at least about 65 J/m$^3$; and (ii) a substantially non-load-bearing liner in contact with said vessel, said liner providing a substantially impermeable barrier to said pressurized liquefied natural gas and being constructed from a material selected from the group consisting of (1) a metallic foil, (2) a synthetic polymer film, (3) a metallic foil on thin polymeric substrate, (4) a metal-coated polymer substrate, (5) a laminate comprising a metallic liner sandwiched between polymeric layers, (6) a laminate comprising at least one sheet of aluminum foil sandwiched between at least two sheets of mylar, and (7) at least one layer of composite material and at least one sheet of aluminum foil.

16. The method of claim 15 further comprising:
    (c) transporting said at least one container holding said pressurized liquefied natural gas to an import terminal.

17. The method of claim 15 wherein said load-bearing vessel is suitable for withstanding pressures of about 1035 kPa (150 psia) to about 7590 kPa (1100 psia) and temperatures of about −123° C. (−190° F.) to about −62° C. (−80° F.).

18. The method of claim 15 wherein said natural gas processing plant comprises at least one process component constructed from an ultra-high strength, low alloy steel containing less than 9 wt % nickel and having a tensile strength greater than about 830 MPa (120 ksi) and a DBTT lower than about −73° C. (−100° F.).

19. The method of claim 15 wherein the step of producing pressurized liquefied natural gas at a pressure of about 1035 kPa (150 psia) to about 7590 kPa (1100 psia) and at a temperature of about −123° C. (−190° F.) to about −62° C. (−80° F.), using said natural gas processing plant, consists essentially of the steps of:
    (a) removing liquid hydrocarbons from said natural gas in feed gas reception facilities;
    (b) removing water from said natural gas in dehydration facilities; and
    (c) liquefying said natural gas in liquefaction facilities.

* * * * *